2,539,392

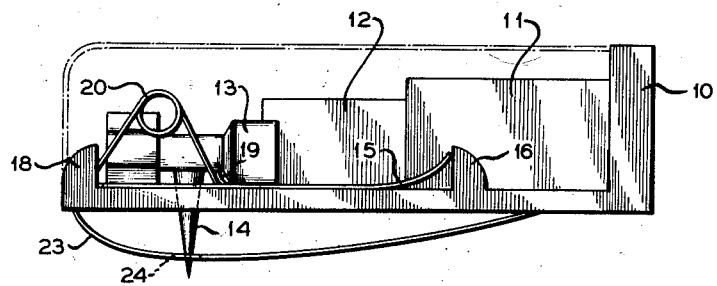
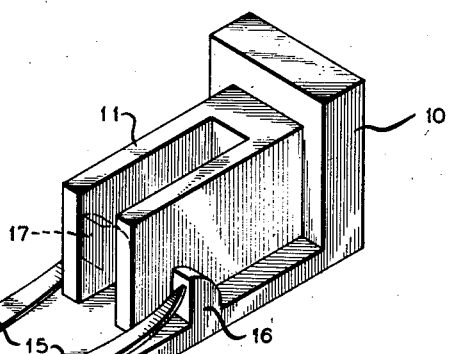
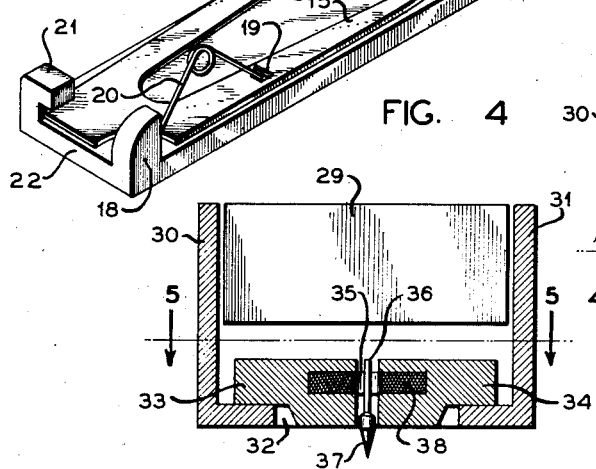
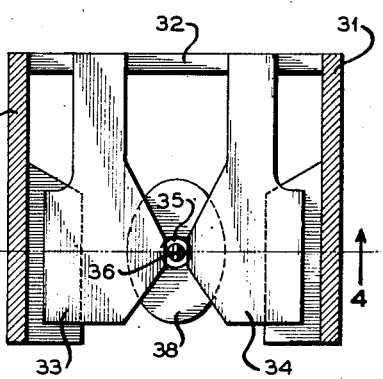
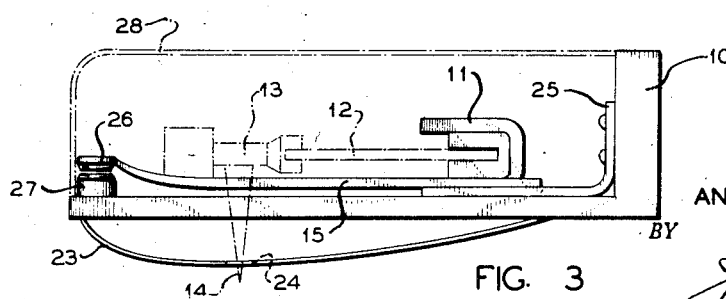
*INVENTOR.*
ANDERS JOHAN ANSAR
BY
HIS ATTORNEY Patented Jan. 30, 1951

UNITED STATES PATENT OFFICE 2,539,392

PROTECTION ARRANGEMENT FOR THE REPRODUCTION NEEDLE IN PICKUPS

Anders Johan Ansar, Nykoping, Sweden

Application May 8, 1947, Serial No. 746,766
In Sweden August 31, 1946

12 Claims. (Cl. 179—100.41)

Pick-ups, especially such pick-ups as are used for reproduction of phonograph records, usually contain parts which are sensitive to lateral shock or strain. For instance, modern pick-ups are often provided with a permanent needle, that is a needle made from a sapphire or some other precious or semi-precious stone. These sapphires are very sensitive to shock or strain and they may also be damaged if the sapphire needle or the needle point made from a sapphire is moved laterally on the phonograph record due to careless handling of the pick-up so that it scratches the grooves of the record. Also certain types of pick-ups also are provided with piezoelectric crystals as voltage creating elements, and these elements are sensitive to strains of the above mentioned types and may be destroyed by them.

The present invention includes an arrangement whereby if the pickup is dropped or the needle subjected to undue shock or strain, the needle will retract within the jaw or frame of the pickup a sufficient distance to preclude damage thereto. For best results this movement should take place when the needle pressure exceeds normal by slightly over one gram. Upon reaching this pressure the needle should retract rapidly in order to prevent damage and to accomplish this a mechanical movement in the nature of a snap action is employed.

The snap action between the needle or the means carrying the needle and the remaining parts of the pick-up may be obtained by several different mechanisms, and of course, the invention is not limited to the use of one specific mechanism. For instance, one may use springs so arranged that up to normal needle pressure movement thereof will be prevented but at a slightly increased pressure the needle will be retracted with a snap. For the same purpose one may use an oil film action or magnetic attraction.

A number of forms of the invention are described below and illustrated in the attached drawings, in which Fig. 1 is a view in side elevation showing an arrangement with a mechanical spring for providing the snap action, Fig. 2 a perspective showing the structure of Fig. 1 with parts omitted for greater clarity, Fig. 3 a side elevation of a modified form of pick-up using a piezoelectric crystal, the snap action being provided either by a magnetic attraction or by the adhesion of an oil film, Fig. 4 an end elevation showing a further modified form using magnetic attraction, and Fig. 5 a plan view of the structure of Fig. 4.

In Fig. 1, 10 is the frame or foundation for the pick-up using a piezoelectric crystal. The crystal fixture 11 is connected to the frame 10 and carries the crystal 12. Attached to its other end the crystal carries a needle fixture 13 to which the shank of the needle 14 is connected. The needle 14 is provided with a sapphire point. Fig. 2 shows the corresponding parts, the crystal 12, the needle fixture 13 and the needle 14, however, being removed. The needle fixture 13 rests against a carrier plate 15 U-shaped in such a way that two bearing points are formed at the free ends of the shanks. These two bearing points contact two projections 16 and 17, respectively, on the frame 10. At the end of the frame 10, adjacent the needle a further projection 18 is arranged, and finally a projection 19 is provided on the carrier plate 15. Between the projections 18 and 19 a spring 20 is interposed, the arrangement being such that the contact point of the spring 20 with the projection 19 is below a line between the contact point of the spring 20 with the projection 18 and the bearing points of the carrier plate 15 on the projections 16 and 17. Therefore, in the position shown in the drawing, the spring 20 will press the carrier plate 15 together with the needle fixture 13 and needle 14 downwardly toward the record to be reproduced. Further a stop in the form of projection 21 is provided on the frame 10 so that the outer end of the carrier plate 15 is movable in the space between the bottom 22 of the carrier plate 15 and the projection 21. On the underside of the pick-up a guard protective covering 23 is provided with an opening 24 through which the needle 14 penetrates.

The arrangement functions in the following way: During normal reproduction of a phonograph record the needle 14 will oscillate laterally of the groove in the record. This will cause a torsional strain on the crystal 12, whereby an electric voltage is generated which when suitably amplified will reproduce the recorded sound. For one reason or another the pick-up may be dropped upon the record, or for some other reason an abnormal force is exerted in a vertical direction on the needle 14. Under the action of this force the needle will be moved upwardly together with the needle fixture 13 and the crystal 12, so that the contact point of the spring 20 with the projection 19 approaches a line between the contact point of the spring with the projection 18 and the bearing axis of the carrier plate 15 on the projections 16 and 17. The more the contact point of the spring with the projection 19 approaches this line, the less will be the component of the spring pressure, which counteracts upward movement of the needle, but in any case the upward movement of the needle will not begin until the needle pressure exceeds the limit value, represented by the tension component of the spring acting in a downward direction during normal reproduction. Finally, the contact point of spring 20 on projection 19 passes the above mentioned line, and at this point the needle 14 together with the needle fixture 13 and the crystal 12 will snap to an upper position determined by the carrier plate 15 contacting the projection 21.

If this upper position is so far from the normal reproduction position of the needle, that the contact point between the projection 19 and the spring 20 has passed the above mentioned line, the carrier plate together with the parts carried thereby will remain in its upper position from which it must be brought back by hand. If, however, the contact point of the projection 19 is not allowed to pass this line, the projection 21 limiting the oscillating motion of the carrier plate correspondingly, only a relief of the needle pressure will take place, but as soon as this relief has taken place the needle will resume its initial position due to the action of the spring 20.

In any case, the total upward movement of the needle will be sufficient to allow the entire needle point to retract within the guard or protecting covering 23, the edges of the opening 24 of the covering 23 thereby absorbing the major part of the shock upon dropping of the needle onto the record.

In the arrangement shown in Figs. 1 and 2, the crystal 12 was mounted in vertical position. However, the crystal may also be mounted horizontally, as shown in Fig. 3, where corresponding parts have been given the same reference numerals as in Figs. 1 and 2.

In the arrangement shown in Fig. 3, however, the carrier plate 15 is connected to the frame 10 by means of a spring 25. The carrier plate 15 carries the crystal fixture 11 which in its turn carries the horizontally mounted crystal 12, and to the outer end of the crystal is attached the needle fixture 13 together with the needle 14. The arrangement is such that the crystal 12 is subjected to torsional strain under the influence of oscillations of the needle fixture 13 caused by lateral movements of the needle 14 in the record grooves. On its end remote from the spring 25, the carrier plate 15 is provided with an iron armature 26, which is normally in contact with a magnet 27 connected to the frame 10.

The attraction between the armature 26 and the magnet 27 is normally so great that these remain in their contacting position, during engagement of the needle 14 with a phonograph record for reproduction thereof. Should, however, an abnormally great vertical force be applied the needle, exceeding for instance by 10 or 20 grams the normal needle pressure, the armature 26 will be separated from the magnet 27 and the carrier plate 15 swung upwardly against the action of the spring 25. During this movement the needle 14 retracts inside the guard or protective covering 23, so that the abnormal shock is substantially received by the covering 23. However, after the shock has been entirely relieved, the spring 25 will cause the carrier plate 15 to swing back to its normal position, in which the needle 14 extends outside the covering 23, and in this way the pick-up is automatically restored to normal condition thus permitting reproduction of the phonograph record.

The pick-up shown in Fig. 3 is enclosed in a cover 28. It is therefore possible to fill the complete pickup with oil, or one can provide for an oil layer or oil film in such a way that so called film adhesion will result. In this case the armature 26 and the magnet 27 will be replaced by two exactly mating smooth surfaces, between which the oil is disposed in the form of a film. By this arrangement a strong adhesion is created between the smooth surfaces, and this will function similarly to the magnetic means described above.

Figs. 4 and 5 show another form of the invention in which both figures illustrate a pick-up in section. Thus, Fig. 4 shows the pick-up in section according to the line IV—IV of Fig. 5, and Fig. 5 shows the same pick-up in section according to the line V—V in Fig. 4.

The arrangement shown in Figs. 4 and 5 contains a magnet 29 provided with two pole shoes 30 and 31, respectively. At their one end the pole shoes 30 and 31 are connected by means of a spring 32 which should be of non-magnetic material. The spring 32 carries two further pole shoes 33 and 34 which are not directly connected with the pole shoes 30 and 31 but normally contact these, so that the magnetic field is conducted to the air gap 35, in which the armature 36 and the needle 37, connected thereto, are movable. In the inner parts of the pole shoes 33 and 34 a winding 38 is arranged in such a way that it encloses the armature 36.

The arrangement functions in the following way: During reproduction the armature 36 will, by engagement of the needle in the record groove, 37 be caused to oscillate in the air gap 35, the field between the pole shoes 33 and 34 thereby being changed in such a way that an electrical voltage is generated in the coil 38. However, it is assumed that the needle 37 is made of some material, sensitive to shock or strain, for instance the needle may be provided with a sapphire point. If the pick-up should be dropped on a phonograph record, the sapphire point would be damaged if it were not retractible. This is, however, made possible by the fact that the attracting force between the pole shoes 30 and 31 and the pole shoes 33 and 34 is not greater than that which will allow said pole shoes to separate if the needle pressure should be somewhat greater than normal. Therefore, if such abnormal needle pressure should occur, by reason which the needle point might be damaged, the pole shoes 33 and 34 will be separated from the pole shoes 30 and 31, and will thereby twist the spring 32. Consequently the needle 37 retracts into the pick-up so that the lower surface of the pole shoes 30 and 31 will directly contact the phonograph record thereby protecting the needle against any damage. As soon as the upward force is received by the pole shoes 30 and 31, the spring 32 will resume its original position whereby the pole shoes 33 and 34 are again brought into contact with the pole shoes 30 and 31. Thereafter the pick-up will be in proper condition for the reproduction of records.

What I claim is:

1. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, means coupling said voltage generating means and said needle whereby said voltage generating means will be actuated upon lateral movement of said needle, means for exerting a predetermined downward force on said support when in said lower position to normally maintain said needle in extended record engaging position, resilient means for exerting an upward force on said support, means including said resilient means to retract said needle within said frame with a snap action when a sudden additional upward force is applied to said needle and the sum of said upward forces is in excess of said predetermined downward force, and means on said pickup for engaging said record to support said pickup while said needle is in retracted position.

2. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, means coupling said voltage generating means and said needle whereby said voltage generating means will be actuated upon lateral movement of said needle, means for exerting a predetermined downward force on said support when in said lower position to normally maintain said needle in extended record engaging position, and resilient means for exerting an upward force on said support, means including said resilient means to retract said needle within said frame with a snap action when a sudden additional upward force is applied to said needle and the sum of said upward forces is in excess of said predetermined downward force.

3. A phonograph pickup comprising a frame, a support mounted in said frame for vertical movement between upper and lower positions, a record engaging needle secured to said support for vertical movement independent of the vertical movement of said support, said needle being retracted within said frame when said support is in said upper position and being extended in record engaging position when said support is in said lower position, voltage generating means, means coupling said voltage generating means and said needle whereby said voltage generating means will be actuated upon lateral movement of said needle, upstanding lugs on said frame, said support comprising a relatively flat bifurcated member, the bifurcated ends of said member pivotally engaging said upstanding lug, a stop on said frame for limiting upward movement of said support, a projection on said support, spring means having one end thereof in engagement with said frame and the opposite end in engagement with said projection on said support, the point of engagement with said projection being below a line between the point of engagement of said spring and said frame and the point of engagement of said bifurcated ends with said lugs when said support is in said lower position whereby said spring exerts a downward force to normally maintain said needle in extended position, the point of engagement of said spring and said projection moving above said line upon upward movement of said support under the action of an upward force in excess of the downward force of said spring applied to said needle whereby said needle will be retracted inwardly of said frame with a snap action and will remain retracted under the action of said spring until manually projected, and a record engaging guard secured to said frame.

4. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, means coupling said voltage generating means and said needle whereby said voltage generating means will be actuated upon lateral movement of said needle, upstanding lugs on said frame, said support comprising a relatively flat bifurcated member, the bifurcated ends of said member pivotally engaging said upstanding lug, a stop on said frame for limiting upward movement of said support, a projection on said support, spring means having one end thereof in engagement with said frame and the opposite end in engagement with said projection on said support, the point of engagement with said projection being below a line between the point of engagement of said spring and said frame and the point of engagement of said bifurcated ends with said lugs when said support is in said lower position whereby said spring exerts a downward force to normally maintain said needle in extended position, the point of engagement of said spring and said projection moving above said line upon upward movement of said support under the action of an upward force in excess of the downward force of said spring applied to said needle whereby said needle will be retracted inwardly of said frame with a snap action and will remain retracted under the action of said spring until manually projected.

5. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, whereby coupling said voltage generating means and said needle whereby said voltage generating means will be actuated upon lateral movement of said needle, said support comprising a bifurcated member, means on said frame pivotally engaging the bifurcated ends of said member, a stop on said frame for limiting upward movement of said support, spring means having one end engaging said frame and the opposite end engaging said support, said point of engagement with said support being below a line between the point of engagement of said spring and said frame and the point of engagement of said bifurcated ends with said frame whereby said spring will normally maintain said support in said lower position with said needle extended in record engaging position, the point of engagement of said spring and said support moving above said line upon upward movement of said support under the action of an upward force applied to said needle whereby said needle will be retracted inwardly of said frame and will be held in retracted position by the action of said spring until manually projected.

6. A phonograph pickup comprising a frame, a support mounted on said frame for vertical movement between upper and lower positions, a record engaging needle secured to said support for vertical movement therewith and for lateral movement independent of the vertical movement of said support, said needle being retracted within said frame when said support is in said upward position and being extended in record engaging position when said support is in said lower position, voltage generating means, means coupling said voltage generating means and said needle whereby said voltage generating means will be actuated upon lateral movement of said needle, means on said frame pivotally mounting said support, resilient means engaging said frame and said support, the point of engagement of said resilient means and said support being below a line between the point of engagement of said resilient means and said frame and the pivotal mounting on said support whereby said resilient means will normally maintain said support in lowermost position and said needle in extended record engaging position, the point of engagement of said resilient means and said support moving above said line upon upward movement of said support under the action of an upward force applied to said needle whereby said needle will retract inwardly of said frame with a snap action and will remain retracted under the action of said resilient means until manually projected.

7. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means actuated by lateral movement of said needle, said support comprising a relatively flat member, resilient means securing one end of said member to said frame and biasing said member toward said upper position, an armature on the opposite end of said member, a permanent magnet secured to said frame and normally engaging said armature whereby said support is held in said lower position with said needle in extended record engaging position, said resilient connection also constituting means to move said support to said upper position with a snap action upon the application of an upward force to said needle when the total upward force on said support exceeds the downward force exerted by said magnet, and a record engaging guard secured to said frame.

8. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means actuated by lateral movement of said needle, said support comprising a relatively flat member, resilient means securing one end of said member to said frame and biasing said member toward said upper position, an armature on the opposite end of said member, a permanent magnet secured to said frame and normally engaging said armature whereby said support is held in said lower position with said needle in extended record engaging position said resilient connection also constituting means to move said support to said upper position with a snap action upon the application of an upward force to said needle when the total upward force on said support exceeds the downward force exerted by said magnet.

9. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, means for actuating said voltage generating means upon lateral movement of said needle, resilient means mounting said support in said frame and biasing said support toward said upper position, magnetic means for exerting a downward force on said support and normally maintaining said support in said lower position with said needle in extended record engaging position, said resilient means serving to move said needle inwardly of said frame with a snap action upon the application of an additional upward force to said needle, the total upward force being in excess of the downward force exerted by said magnetic means, said needle being retained within said frame by said resilient means until projected manually therefrom.

10. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, a coil mounted in said frame, an armature disposed within said coil, means coupling said needle and said armature whereby upon lateral movement of said needle said armature will be actuated to generate a voltage in said coil, a magnet secured to said frame, a pair of pole shoes secured to said magnet means on said support engaging said pole shoes when said support is in said lower position, means resiliently securing said support to said frame and biasing said support to said upper position against the action of said magnet, said resilient means serving to retract said needle within said frame with a snap action upon the application of an additional upward force to said needle, the total upward force exceeding the downward force exerted by said magnet, said pole shoes also constituting a guard for engaging said record when said needle is in retracted position.

11. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, means coupling said voltage generating means and said needle whereby said voltage generating means will be actuated upon lateral movement of said needle, resilient means connecting said support and said frame and biasing said support toward said upper position, a surface on said frame, a complementary surface on said support engaging said first mentioned surface when said support is in said lower position, an oil film between said surfaces, the adhesion of said oil film normally maintaining said support in said lower position against the action of said resilient means, said resilient means serving to move said support upwardly and retract said needle inwardly of said frame with a snap action upon the application of an additional upward force to said needle, the total upward force thereon exceeding the adhesion of said oil film.

12. A phonograph pickup comprising a frame, a support mounted in said frame for vertical movement between upper and lower positions, a record engaging needle secured to said support for vertical movement therewith and for lateral movement independent of the vertical movement of said support, said needle being retracted within said frame when said support is in said upper position and being extended in record engaging position when said support is in said lower position, voltage generating means, means coupling said voltage generating means and said needle whereby said voltage generating means will be actuated upon lateral movement of said needle, a surface on said frame, a complementary surface on said support engaging said first mentioned surface when said support is in said lower position, an adhesive between said surfaces, resilient means connecting said support and said frame and biasing said support toward said upper position against the action of said adhesive, said resilient means serving to move said support upwardly and retract said needle within said frame with a snap action upon the application of an additional upward force to said needle, the total upward force on said support exceeding the adhesion of said adhesive.

ANDERS JOHAN ANSAR.

REFERENCES CITED

The following references are of record in the file of this patent:

UNITED STATES PATENTS

| Number | Name | Date |
|---|---|---|
| 814,561 | Parsons | Mar. 6, 1906 |
| 1,904,408 | Charlin | Apr. 18, 1933 |
| 2,232,243 | Judson | Feb. 18, 1941 |
| 2,348,660 | Stephan | May 9, 1944 |
| 2,444,218 | Carnahan | June 29, 1948 |

Certificate of Correction

Patent No. 2,539,392 January 30, 1951

ANDERS JOHAN ANSAR

It is hereby certified that error appears in the printed specification of the above numbered patent requiring correction as follows:

Column 6, line 57, for the word "whereby" read *means*; column 9, line 3, for "reracted" read *retracted*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*